Patented Nov. 27, 1934

1,981,849

UNITED STATES PATENT OFFICE 1,981,849

HEAT EXCHANGE MEDIUM

Phillip H. Elliott, Charleston, W. Va., and Ward E. White, Columbus, Ohio, assignors to Chemical Manufacturing Company, Point Pleasant, W. Va., a corporation of West Virginia No Drawing. Application March 30, 1933, Serial No. 663,663

6 Claims. (Cl. 252—5)

The present invention relates to liquids for use in transferring heat, and the process of preparing the same.

More specifically it relates to compositions of matter having a high boiling point and a low specific heat, which may be inserted between a primary source of heat and a boiler or the like in order to transfer heat from said primary source to said boiler. While water may be used in the boiler, as in the other systems at present usual, greater efficiency may be secured by using special solutions as the heat transferring medium throughout the entire radiation system.

Within the boiler, water may be employed as customary, but greater efficiency has been secured in the dual transfer to another solution substituted for water as the medium for transferring the heat throughout the radiation system.

Still more specifically it consists of a composition of matter containing oils, organic acids, such as oleic acid, and, in some cases, mineral or other salts dissolved or otherwise disseminated therein.

Still more specifically, it comprises cases wherein the second solution, which is substituted for water, is a composition of matter containing alcohols, esters, glycerol, alcohol, metal salts, metallic salts, in various combinations, dissolved or otherwise disseminated therein, and, obviously, by various combinations, any or several of the herein mentioned substances may or may not be eliminated in the composition of matter employed that is found to be soluble in water or otherwise disseminated therein.

In transferring heat from a primary source of heat, such as a furnace fire or the like, to the water in a boiler in order to heat said water, a difficulty arises, in that there is an excessive difference of temperature between the furnace fire and the temperature of the water, thus making it difficult to efficiently transfer the heat from the fire to the water, with the result that much heat is wasted in the combustion products passing into the flue. It is obvious that a much fore efficient and easier controlled transfer of heat could be obtained by interposing, between the boiler and the primary source of heat, a suitable medium which could operate successfully at a higher temperature than water and would, therefore, serve as an intermediate stage in the said heat transfer.

In transferring heat absorbed or stored in the water throughout a radiation system, both the superficial surface and the cubical content of the radiation system must be coordinated within the limits of the operating temperatures for water, which are usually limited in range to a 20 or 40 deg. F. difference and the upper limit, because water boils at 212 deg. F. is seldom above 180 deg. in temperature. It is obvious that a much more efficient and easier controlled transfer of heat could be obtained if the physical characteristics of water would permit of higher operating temperatures, and, hence, by substituting a liquid composition of matter, whether same be miscible, homogeneous, or a colloidal system, the composition thus employed having greater thermal capacity as compared with water, together with a higher boiling point than water would be a suitable liquid for radiator heat transferring media, and as substituted herein in place of water, would permit of greater overall economy and efficiency in full coordination with the initial first cost of surfacing and the operating utilization cost of distribution.

Again, by the dual solutions it has been found that a higher thermal efficiency "over-all" has been secured throughout the initial transfer by the interposed intermediate solution, and, again, in the utilization of the transfer to a substituted solution, in place of water, as the means for conveying the heat captured from the intermediate solution at much higher temperatures and, because the physical properties of the solution substituted for water, operating at higher temperatures than water would permit higher efficiency of heat transference through the employment of such dual solution, and greater or intermediate or below the practical operating conditions, in some cases, should the interposing medium from the external heat applied be employed throughout for heat transference radiation utilization.

Heat absorption by an interposed medium at greater efficiencies from the external applied heat operating by transference at greater efficiencies to a second medium possessing the intermediate physical properties, enabling greater utilization value of heat transference and deliverance throughout a radiation system with greater overall efficiencies than is practical or customary in the present day boiler and radiation water systems.

We have found that a suitable medium for this purpose consists of an oil, or oils, which may have certain salts, acids, catalytic substances or the like dissolved or suspended therein, said resulting composition being so constituted as to have a high boiling point, a relatively low specific heat and stability at relatively high temperatures approaching its boiling point, for long continued or indefinite periods of operation.

From the inventors' experimentation it appears that the most effective exchange or transfer of heat is materially increased when solutions "A" are interposed between solutions "B" which are intermediate in physical properties, more closely resembling those of water and being within ranges in specific gravity of plus or minus .2 and in specific heat the range so far determined to be plus or minus .2 with water in both instances being unity. The said "B" solutions have a boiling point lower than solutions "A" and, in most cases, higher thermal capacity than "A" solutions and viscosity approaching that of water and a great deal less than solutions "A." In both solutions "A" and "B" the "heat of solution" is positive for all the various solid substances dissolved or disseminated therein.

Within the principles herein disclosed it is possible so to design and coordinate for maximum efficiency and, at the same time, it is possible to change these solutions "chemically" so that on revamping a poorly surfaced radiator installation, without mechanical change, the solutions may be apportioned within the range of the physical properties using the co-pending apparatus under application for Letters Patent and the revampment occurs with minimum expense and time and the desired heat is obtained. This amounts to correcting heating troubles, chemically, not mechanically as is customary.

A preferred composition of matter suitable for this purpose consists of 75 parts of peanut oil, 14 parts rapeseed oil, 1 part of aluminum stearate and 10 parts oleic acid. This mixture has a specific heat approximately one-half that of water and will, therefore, require only one-half as much heat to raise it to a given temperature as would the same amount of water, thus making it correspondingly easier to bring the composition to its operating temperature and storing in itself only one-half as much heat as would some other medium having a specific heat approaching that of water. As a result of the low specific heat it is also possible to bring it to its operating temperature much more rapidly than water or the like. By interposing this medium in a closed container between the primary source of heat, on the one hand, and the water or other liquid to be heated, on the other hand, it is obvious that an efficient and rapid transfer of heat can be caused to take place, due to the fact that the medium operates at a convenient temperature lying between the relatively high temperature of the primary source of heat and the comparatively low temperature of water in the boiler. While the proportions above given are those preferred in practice, they may also be varied within certain limits, as will be seen from the following table:

|  | Preference | Proportion |
|---|---|---|
|  | Percent | Percent |
| No. 1: |  |  |
| Peanut oil | 75 | 14 to 75 |
| Rapeseed oil | 14 | 75 to 14 |
| Aluminum stearate | 1 | .1 to 2 |
| Oleic acid | 10 | 10.9 to 9 |

While it has been found that the composition, above defined, is particularly advantageous for the present purpose, the present inventors have discovered that other compositions may also be used for this purpose; for example, a composition containing liquid hydrocarbons with suitable metallic salts dissolved, colloidally dissolved, or suspended therein. Other compositions comprise oils having salts of the alkali metal group, such as the bromids, fluorids and chlorids, for example, dissolved therein, with or without aluminum stearate, are also applicable for the purpose.

Other salts that may be used are various metallic sulfates or calcium nitrate.

Still other compositions comprising oils having elemental metals in colloidal solution, such as aluminum and magnesium, have been prepared and experimented with and are applicable for the purpose, under certain conditions.

The following specific compositions have also been found advantageous for the purpose:

*Other solutions—"A"*

Absorber or boiler solutions—or—heat absorbing media or agents

Preference formulæ with proportion limits. Parts by weight

|  | Preference | Proportion |
|---|---|---|
|  | Percent | Percent |
| No. 2: |  |  |
| Peanut oil | 50 | 10 to 65. |
| Whale oil | 10 | 30 to 10. |
| Mineral oil | 33 | 55 to 8. |
| Oleic acid | 5 | 3 to 15 common solvent. |
| Glycerol | 1.95 | Same. |
| Sodium nitrate | .05 | Do. |
| No. 3: |  |  |
| Peanut oil | 75 | 83 to 5. |
| Rapeseed oil | 13 | 5 to 83. |
| Zinc stearate | 2 | .1 to 3. |
| Oleic acid | 10 | 11.9 to 9. |
| No. 4: |  |  |
| Peanut oil | 50 | 90 to 50. |
| Castor oil | 50 | 10 to 50 vegetable oils. |
| No. 5: |  |  |
| Peanut oil | 50 | 95 to 5. |
| Paraffine oil | 50 | 5 to 95. |
| No. 6: |  |  |
| Peanut oil | 50 | 80 to 30. |
| Whale oil | 40 | 17 to 55 animal oils. |
| Oleic acid | 10 | 3 to 15. |
| No. 7: |  |  |
| Peanut oil | 39 | 70 to 19. |
| Paraffine oil | 50 | 19 to 70. |
| Oleic acid | 10 | 10.9 to 8. |
| Aluminum stearate | 1 | .1 to 3. |

It will be noted that this composition (No. 7) is very similar to No. 1, and it is in fact nearly equivalent thereto in action.

*Solutions—"B"*

Exchanger or radiator solutions—or—heat transference media or agents

Preference formulæ with proportion limits. Parts by volume

|  | Preference | Proportion |
|---|---|---|
|  | Percent | Percent |
| No. 1: |  |  |
| Alcohol | 20 | 1 to 20 sol. alcohols. |
| Water | 80 | 99 to 80. |
| No. 2: |  |  |
| Alcohol | 20 | 1 to 20 sol. alcohols. |
| Ethyl lactate (the ester). | 1 | .1 to 5 sol. esters. |
| Water | 79 | 98.9 to 75. |
| No. 3: |  |  |
| Alcohol | 10 | 1 to 10 sol. alcohols. |
| Glycerin | 20 | 5 to 35 common solvent for esters. |
| Ethyl lactate | 2 | 1 to 10. |
| Water | 68 | 93.9 to 45. |
| No. 4: |  |  |
| Alcohol | 5 | 1 to 10 sol. alcohols. |
| Glycerin | 35 | 50 to 10 glycerin. |
| Water | 60 | 49 to 80. |
| No. 5: |  |  |
| Ethylene glycol | 24 | 1 to 30 common solvent. |
| Ester | 1 | .1 to 5 sol. high B. P. |
| Water | 75 | 98.9 to 65. |
| No. 6: |  |  |
| Ethylene glycol | 24 | 1 to 30 common solvent. |
| Alkali metal salts | 1 | .1 to 3 sol. |
| Water | 75 | 98.9 to 67. |
| No. 7: |  |  |
| Ethyl alcohol | 5 | 1 to 10 sol. alcohols. |
| Glycerin | 16⅔ | 5 to 20 glycerin. |
| Ethyl acetate | ⅔ | .1 to 10 sol. esters high B. P. |
| Ethylene Glycol | 12⅔ | .1 to 20 common solvent. |
| Water | 65 | 93.8 to 40. |

Solutions—"B"—continued

Exchanger or radiator solutions—or—heat transference media or agents

Preference formulæ with proportion limits. Parts by volume

|  | Preference | Proportion |
|---|---|---|
|  | Percent | Percent |
| No. 8: |  |  |
| Ethylene glycol | 24 | 1 to 30 common solvent. |
| Metallic Salt | 1 | .1 to 3 sol. |
| Water | 75 | 98.9 to 67. |
| No. 9: |  |  |
| Ethyl alcohol | 4 | 1 to 7 sol. alcohols. |
| Glycerin | 16¾ | 5 to 20 glycerin. |
| Metallic salt | 1 | .1 to 3 sol. |
| Ethyl lactate | ¼ | .1 to 10 sol. esters high B. P. |
| Ethylene glycol | 12¾ | .1 to 20 common solvent. |
| Water | 65 | 93.7 to 40. |
| No. 10: |  |  |
| Alcohol | 10 | 1 to 10 sol. alcohols. |
| Glycerin | 20 | 5 to 35. |
| Oleic acid | 2 | .1 to 10. |
| Water | 68 | 93.9 to 45. |

Among the above "B" solutions, No. 7 is the preferred one and is believed to give superior results.

In certain cases it may be desirable to add other ingredients to these solutions, particularly to solutions of the "B" class, for the purpose of modifying the odor or making it easy or difficult to detect the presence of the vapor, as the case may be. For example, in certain cases it might be found desirable to add a substance having a pleasant odor to the composition so that in case of accidental leakage no unpleasant effects will be produced in the room in which the radiator or the like is located; whereas, in other cases, the reverse may be desirable, that is, it may be highly important to provide a substance having a readily detectable odor in the mixture in order to make it easy to detect and locate any leaks, much as is done when an artificial odorizing substance is added to natural gas to make it easy to detect leakage of the same.

Such substances may, for example, be various essential oils, or one of the following substances:

|  | Preference | Proportion |
|---|---|---|
| Methyl salicylate (artificial oil wintergreen). | .2% | .1 to 2% essential oils. |
| Diamino-methyl-acridinium-chlorid. | 1 to 16000 "B" | .1 to 3 into 16000 "B" inert organic substances. |

Organic esters which have distinctive odors and which may be used for the purpose of giving odors to solutions "B" include, among others, the following: amyl acetate; ethyl acetate, formate, lactate, propionate; methyl butyrate, chlorid, formate, fluorid, propionate; propyl acetate; formate; isopropyl formate; and isoamyl acetate.

Another portion of the present invention resides in the process of preparing the various mixtures and solutions hereinbefore mentioned.

In making up the "A" compositions the procedure is preferably as follows:

In making composition No. 1, a paste is first made of some of the oleic acid and of the aluminum stearate and then the remainder of the oleic acid is added, then warming the same to 100–120° Fahrenheit, making sure that the solution becomes clear by heating properly for a sufficient time. The second step is to warm each oil separately to temperatures between 80–100° Fahrenheit and thoroughly mix them together by suitable agitation. The third step is to pour the second solution slowly into the first solution with suitable agitation at temperatures between 80–100° F.

In making up composition No. 2 the first step is to dissolve the sodium nitrate in the glycerin at temperatures between 140–160° F. This solution is then added to the oleic acid. The three oils are warmed separately and mixed together with suitable agitation at 90 to 100° F. and this mixture of the oils is then added to the other mixture with constant agitation at a temperature not less than 80° F.

In making up composition No. 3 the steps are the same as in the case of composition No. 1, except that zinc stearate is used in place of the aluminum stearate.

In making up compositions Nos. 4 and 5 the first step is to warm each oil separately to temperatures between 80–100° F. and to mix them together thoroughly by suitable agitation.

In making up composition No. 6 the oils are first warmed separately to temperatures of 120–140° F. and mixed together by a suitable agitation and then the oleic acid is added as the second step of the process, and thoroughly mixed with the oils.

In making up composition No. 7 the steps are the same as those in making up composition No. 1, with the exception that a mineral oil takes the place of one of the vegetable oils of composition No. 1.

The coloring matters and odorizing or deodorizing matters are added last to all the formulas, when used. The coloring may be dissolved in glycerin.

Liquids of this nature make possible great economy by permitting the absorption of the maximum number of heat units by reason of the higher operating temperatures, particularly if employed in suitably designed apparatus whereby low stack temperatures may at the same time be secured.

In making up the "B" compositions the procedure is preferably as follows:

In composition No. 1 the alcohol is poured into the water, or vice versa, with suitable agitation.

Composition No. 2 is made up by first dissolving the ethyl lactate in the alcohol and then adding this alcoholic solution to the water with suitable agitation.

In making up composition No. 3 the ethyl lactate is first dissolved in the alcohol and the glycerin in the water, with suitable agitation in each case and thereupon the alcoholic solution is poured into the aqueous solution, also with agitation.

In making up composition No. 4 the glycerin is first dissolved in the alcohol with suitable agitation and thereupon this solution is mixed with the water likewise with suitable agitation.

Composition No. 5 is prepared by first dissolving a suitable ester in the water with stirring and then pouring this aqueous solution into the ethylene glycol solution with agitation.

In making up composition No. 6 the salts of the alkali metal may be dissolved in either the ethylene glycol or the water, depending upon readiness of solubility. Slight warming and agitation will ordinarily be used, and the solution thus prepared will then be mixed with the other liquid, with suitable agitation.

In preparing composition No. 7 the ethylene glycol is mixed with the alcohol with suitable agitation, the ester (ethyl acetate) is then added to this solution, the water is next added and finally the glycerin, suitable agitation being used in each step to produce a homogeneous composition.

In making up composition No. 8 the steps are the same as those of No. 6.

In preparing composition No. 9 the metallic salt is preferably dissolved in the alcohol by means of heat and agitation and the water is then added to the resulting solution. The ethyl lactate is dissolved in the ethylene glycol with agitation and the glycerin added to this mixture, whereupon said last named mixture is added to the mixed alcohol, metallic salt and water with suitable agitation.

In preparing composition No. 10 the oleic acid is dissolved in the alcohol with agitation and the glycerin then added with further agitation and finally the water is added to the result, with sufficient agitation to produce a homogeneous composition.

Coloring and deodorizing or odorizing matters, when used, may be added last to all the formulas. The coloring is preferably dissolved in glycerin.

Liquids of this nature make possible great economy by permitting the absorption of the maximum number of heat units by reason of the higher operating temperatures, particularly if employed in suitably designed apparatus and the acceleration of heat transference from a lower specific heat liquid to a liquid approaching water in specific heat, or within ranges mentioned herein, makes for efficiency and permits economy in operation and, again, in initial cost of installation, because of thermal capacity and other properties of the transferring medium throughout its utilization value of heat deliverance at predetermined points for radiation.

For example, instead of using the liquid or composition between a primary source of heat and a boiler for water or "B" solutions or the like, it may also be used directly in a circulating system in place of the hot water frequently used in house heating plants. By employing this liquid in a so-called hot water heating plant it is possible to decrease the weight and cubical contents of the radiator system and the boiler because the medium can be heated to a higher temperature in the boiler and caused to radiate its heat from a higher temperature in the rooms to be heated, thus facilitating the transfer of heat from the furnace to the spaces to be heated. Owing to the low specific heat, it is evident that the liquid can be brought to the same operating temperature as water in a much shorter time or, in the same time, can be brought to approximately double the temperature of water. However, the radiation depends upon a power higher than the first of the difference of temperature of the space to be heated and the radiator heating the same, thus making it clear that the liquid can heat the space much more rapidly than could a radiator filled with water or the like. Certain of these advantages can, of course, be obtained by means of steam, for the same reason of high temperature operation, but steam, of course, has the obvious disadvantage of being comparatively slow of coming up from an initially cold condition, that is, the water must first be raised to the boiling point and then evaporated before any steam heating system can come into operation, whereas a system employing either solutions "A" or "B" separately, or together, or wherein "A" is used with water, does not depend upon evaporation of the liquid, but upon direct heat transference by conduction, convection and radiation.

It is for this reason that hot water starts to heat sooner after the fire is started than would steam, and solutions "A" and possibly several of solutions "B" employed under certain conditions, as solutions "A" directly without interposing, exchanging, dividing, or conduction surfacing, in turn have a like advantage over hot water, for the reason already stated, that because of their lower specific heat they can more rapidly be brought to the operating temperature, which advantage is further enormously increased by reason of the fact that they can operate at a much higher temperature than water, without being changed to vapor or chemically altered by the heat. This, in turn, permits the use of much smaller installations, that is, smaller boilers, smaller sized pipes, and smaller heating radiators, so that the quantity of liquid in the heating system is materially less than the quantity of water that would be required for the corresponding heating service.

Even if the ordinary hot water, steam or vacuum-vapor heat system is to be retained, material advantages may be attained by interposing a body of my composition between the primary source of heat and the heating medium used in the boiler and radiators.

It is obvious that by withdrawing the radiator medium and substituting another medium of known characteristics, such as a 27% solution of calcium chloride with specific gravity of 1.25, or certain compositions of "B" solutions, then when by-passed from the heating apparatus and connected with an ice chest, or operating with mechanical refrigeration, the circuit thus completed or closed for forced circulation by means of a pump connected therewith, will cool the compartment through radiation at lower operating temperatures, and the thermal cycle, in some instances, will be complete and operative without the means of forced circulation.

It is also possible by providing properly designed baffles in the primary heater to recover heat which would otherwise be lost in the stack and to lower the stack temperature, the heat stored in the baffles being later imparted to the liquid and used for any desired purpose.

It is clear that while there is mentioned specifically a furnace fire as the primary source of heat, other sources could also be used, for example, an electrical heater or a gas flame or the flame of an oil burner or the like; in fact, any primary heat source whatever that may be desirable in any particular instance.

The inventors are not certain as to the exact reasons why their liquids have great efficiency when used in heating systems, but believe that the theories above advanced probably explain the true operation. It will be noted that colloidal solutions and solutions having catalytic effects, in certain cases, are included among the formulae disclosed herein, and it may be that such colloidally suspended salts, or dissolved salts, have some unexplained action in improving the effect of the liquids.

The fact remains, regardless of any scientific explanation, that the liquid or heat absorbing agent having soluble metallic salts embodied therein has greater heating efficiency than the same liquid without such salts and that such liquids are suitable for continuous, uniform and efficient operation for periods of almost indefinite length.

All the usual controls may be employed when these liquids are used in a heating system, such as thermostats, dampers, etc.

It should not be considered that the invention is limited to household or other room heating purposes, but it is applicable also for the production of power or the generation of steam and it lends itself readily to the various systems at present in commercial use.

Having described the invention and given several examples of compositions which are suitable and of installations in which they may be used, it will be understood that the invention is not to be considered as limited to the specific features disclosed herein, but only by the appended claims.

What is claimed as new is:

1. A heat exchange medium comprising a vegetable oil, and about five per cent (5%) or more of oleic acid.

2. A heat exchange medium comprising a vegetable oil, about five per cent (5%) or more oleic acid, and a metal soap.

3. A heat exchange medium comprising peanut oil, rapeseed oil, aluminum stearate, and oleic acid.

4. A heat exchange medium comprising substantially seventy-five per cent (75%) peanut oil, thirteen per cent (13%) rapeseed oil, two per cent (2%) aluminum stearate, and two per cent (2%) oleic acid.

5. A heat exchange medium comprising a vegetable oil, a mineral oil, and oleic acid.

6. A heat exchange medium comprising a vegetable oil, a mineral oil, oleic acid, and aluminum stearate.

PHILLIP H. ELLIOTT.
WARD E. WHITE.